US00RE45914E

(19) United States
(12) Reissued Patent
Oren et al.

(10) Patent Number: US RE45,914 E
(45) Date of Reissued Patent: Mar. 8, 2016

(54) PROPPANT VESSEL

(71) Applicant: Oren Technologies, LLC, Houston, TX (US)

(72) Inventors: John Oren, Houston, TX (US); Joshua Oren, Houston, TX (US)

(73) Assignee: OREN TECHNOLOGIES, LLC, Houston, TX (US)

(21) Appl. No.: 29/518,163

(22) Filed: Feb. 20, 2015

Related U.S. Patent Documents

Reissue of:
(64) Patent No.: Des. 688,772
Issued: Aug. 27, 2013
Appl. No.: 29/436,167
Filed: Nov. 2, 2012

U.S. Applications:
(62) Division of application No. 29/500,678, filed on Aug. 27, 2014, which is an application for the reissue of Pat. No. Des. 688,772.

(51) LOC (10) Cl. ..... 23-01
(52) U.S. Cl.
USPC ..... D23/202
(58) Field of Classification Search
USPC ..... D23/202–206; D3/273; 206/386, 600, 206/1.5; D34/38
CPC ..... B65D 88/20; B65D 88/26; B65D 88/129
See application file for complete search history.

(56) References Cited

U.S. PATENT DOCUMENTS

| | | | |
|---|---|---|---|
| 137,871 | A | 4/1873 | Worsley |
| 150,894 | A | 5/1874 | Safely |
| 384,443 | A | 6/1888 | Hoover |
| 448,238 | A | 3/1891 | Johnson |
| 1,143,641 | A | 6/1915 | McGregor |

(Continued)

FOREIGN PATENT DOCUMENTS

| | | |
|---|---|---|
| CA | 2023138 | 2/1992 |
| CA | 2791088 | 3/2013 |
| DE | 3342281 | 6/1985 |
| EP | 0019967 | 12/1980 |
| EP | 1775190 | 4/2007 |

(Continued)

OTHER PUBLICATIONS

International Search Report for related International Application No. PCT/US2012/066639, Feb. 25, 2013.

(Continued)

*Primary Examiner* — Phillip S Hyder
(74) *Attorney, Agent, or Firm* — Hogan Lovells US LLP

(57) CLAIM

The ornamental design for a proppant vessel, as shown and described.

DESCRIPTION

FIG. 1 is an upper perspective view of the proppant vessel showing our [deign.] *design;*
FIG. 2 is a front elevation view thereof;
FIG. 3 is a rear elevation view thereof;
FIG. 4 is a *right* side elevation view thereof;
FIG. 5 is [an opposite] *a left* side elevation view thereof;
FIG. 6 is a top plan view thereof; and,
FIG. 7 is a bottom plan view thereof.
*The broken lines depict portions of the proppant vessel in which the design is embodied that are not considered part of the claimed design.*

1 Claim, 2 Drawing Sheets

Matter enclosed in heavy brackets [ ] appears in the original patent but forms no part of this reissue; matter printed in italics indicates the additions made by reissue.

Amended

(56) References Cited

U.S. PATENT DOCUMENTS 1,331,883 A 2/1920 Stuart
1,344,768 A 6/1920 Messiter
1,434,488 A 11/1922 Forsythe et al.
1,520,560 A 12/1923 Burno
1,506,936 A 9/1924 Lea
1,526,527 A 2/1925 Butler
1,573,664 A 2/1926 Wetherill
1,850,000 A 3/1932 Fernand
1,973,312 A 9/1934 Hardinge
2,233,005 A 2/1941 Garlinghouse
2,368,672 A 2/1945 McNamara
2,564,020 A 8/1951 Mengel
2,616,758 A 11/1952 Meyers
2,622,771 A 12/1952 Tulou
2,652,174 A 9/1953 Shea et al.
2,865,521 A 12/1958 Fisher et al.
2,894,666 A 7/1959 Campbell, Jr.
3,049,248 A 8/1962 Heltzel et al.
3,064,832 A 11/1962 Heltzel
3,083,879 A 4/1963 Coleman
3,090,527 A 5/1963 Rensch
3,199,585 A 8/1965 Cronberger
3,248,026 A 4/1966 Kemp
3,270,921 A 9/1966 Nadolske et al.
3,281,006 A 10/1966 Tohchung
3,294,306 A 12/1966 Areddy
3,318,473 A 5/1967 Jones et al.
3,353,599 A 11/1967 Swift
3,378,152 A 4/1968 Warner
3,387,570 A 6/1968 Pulcrano et al.
3,397,654 A 8/1968 Snyder
3,407,971 A 10/1968 Oehler
3,455,474 A 7/1969 Truncali
D216,511 S * 1/1970 Coleman ..... D23/202
3,528,570 A 9/1970 Pase
3,561,633 A * 2/1971 Morrison et al. ..... 220/1.5
3,587,834 A 6/1971 Dugge
3,601,244 A 8/1971 Ort et al.
3,602,400 A 8/1971 Cooke
3,661,293 A 5/1972 Gerhard et al.
3,738,511 A 6/1973 Lemon et al.
3,785,534 A 1/1974 Smith
3,817,261 A 6/1974 Rogge
3,986,708 A 10/1976 Hellzel et al.
4,004,700 A 1/1977 Empey
4,063,656 A 12/1977 Lambert
4,138,163 A * 2/1979 Calvert et al. ..... 406/129
4,178,117 A 12/1979 Brugler
4,210,273 A 7/1980 Hegele
4,210,963 A 7/1980 Ricciardi et al.
RE30,358 E 8/1980 Sensibar
4,232,884 A 11/1980 DeWitt
4,239,424 A 12/1980 Pavolka
4,247,228 A 1/1981 Gray et al.
4,265,266 A 5/1981 Kierbow et al.
4,282,988 A 8/1981 Hulbert, Jr.
4,350,241 A 9/1982 Wenzel
4,359,176 A 11/1982 Johnson
4,363,396 A 12/1982 Wolf et al.
4,397,406 A 8/1983 Croley
4,398,653 A 8/1983 Daloisio
4,402,392 A 9/1983 Fabian et al.
4,407,202 A 10/1983 McCormick
4,408,886 A 10/1983 Sampson et al.
4,428,504 A 1/1984 Bassett et al.
4,449,861 A 5/1984 Saito et al.
4,532,098 A 7/1985 Campbell
4,608,931 A 9/1986 Ruhmann et al.
4,626,155 A 12/1986 Hlinsky et al.
4,701,095 A 10/1987 Berryman et al.
4,715,754 A 12/1987 Scully
4,738,774 A 4/1988 Patrick
4,801,389 A 1/1989 Brannon et al.
4,819,830 A 4/1989 Schultz
4,848,605 A 7/1989 Wise
4,882,784 A 11/1989 Tump
4,909,378 A 3/1990 Webb
4,909,556 A 3/1990 Koskinen
4,919,583 A 4/1990 Speakman, Jr.
4,946,068 A 8/1990 Erickson et al.
4,975,205 A 12/1990 Sloan
4,995,522 A 2/1991 Barr
5,004,400 A 4/1991 Handke
5,069,352 A * 12/1991 Harbolt et al. ..... 220/1.5
5,102,286 A 4/1992 Fenton
5,105,858 A 4/1992 Levinson
5,131,524 A 7/1992 Uehara
5,199,826 A 4/1993 Lawrence
5,201,546 A 4/1993 Lindsay
5,224,635 A 7/1993 Wise
5,286,158 A 2/1994 Zimmerman
5,373,792 A 12/1994 Pileggi et al.
5,402,915 A 4/1995 Hogan
5,413,154 A 5/1995 Hurst, Jr. et al.
5,429,259 A * 7/1995 Robin ..... 217/65
5,441,321 A 8/1995 Karpisek
5,470,175 A 11/1995 Jensen et al.
5,538,286 A 7/1996 Hoff
5,564,599 A 10/1996 Barber et al.
5,602,761 A 2/1997 Spoerre et al.
5,613,446 A 3/1997 DiLuigi et al.
RE35,580 E 8/1997 Heider et al.
5,687,881 A * 11/1997 Rouse et al. ..... 222/185.1
5,690,466 A 11/1997 Gaddis et al.
5,704,477 A * 1/1998 Hermann et al. ..... 206/386
5,706,614 A * 1/1998 Wiley et al. ..... 52/79.1
5,761,854 A * 6/1998 Johnson et al. ..... 52/69
5,762,222 A * 6/1998 Liu ..... 220/1.5
5,782,524 A 7/1998 Heider et al.
5,806,863 A 9/1998 Heger et al.
5,836,480 A 11/1998 Epp et al.
5,876,172 A 3/1999 Di Rosa
5,911,337 A 6/1999 Bedeker
5,927,558 A 7/1999 Bruce
5,971,219 A 10/1999 Karpisek
6,002,063 A 12/1999 Bilak et al.
6,069,118 A 5/2000 Hinkel et al.
6,077,068 A * 6/2000 Okumura ..... 431/1
6,109,486 A 8/2000 Lee
6,120,233 A 9/2000 Adam
6,155,175 A 12/2000 Rude et al.
6,190,107 B1 2/2001 Lanigan et al.
6,192,985 B1 2/2001 Hinkel et al.
6,205,938 B1 3/2001 Foley et al.
6,247,594 B1 6/2001 Garton
6,283,212 B1 9/2001 Hinkel et al.
6,306,800 B1 10/2001 Samuel et al.
6,328,156 B1 12/2001 Otsman
6,328,183 B1 12/2001 Coleman
6,364,584 B1 * 4/2002 Taylor ..... 410/94
6,401,983 B1 6/2002 McDonald et al.
6,415,909 B1 7/2002 Mitchell et al.
6,457,291 B2 10/2002 Wick
6,508,615 B2 1/2003 Taylor
6,660,693 B2 12/2003 Miller et al.
6,675,073 B2 1/2004 Kieman et al.
6,720,290 B2 4/2004 England et al.
6,772,912 B1 8/2004 Schall et al.
6,776,235 B1 8/2004 England
6,783,032 B2 8/2004 Fons
6,811,048 B2 * 11/2004 Lau ..... 220/1.5
6,828,280 B2 12/2004 England et al.
6,835,041 B1 12/2004 Albert
6,882,960 B2 4/2005 Miller
6,902,061 B1 6/2005 Elstone
6,915,854 B2 7/2005 England et al.
6,953,119 B1 10/2005 Wening
6,955,127 B2 10/2005 Taylor
6,968,946 B2 11/2005 Shuert
7,036,662 B2 * 5/2006 Schutz ..... 206/386
7,084,095 B2 8/2006 Lee et al.
7,104,425 B2 9/2006 Le Roy
7,140,516 B2 11/2006 Bothor
7,214,028 B2 5/2007 Boasso

(56) References Cited

U.S. PATENT DOCUMENTS

| | | | | |
|---|---|---|---|---|
| 7,240,681 | B2 | 7/2007 | Saik | |
| 7,252,309 | B2 | 8/2007 | Eng Soon et al. | |
| 7,284,579 | B2 | 10/2007 | Elgan et al. | |
| 7,316,333 | B2 | 1/2008 | Wegner | |
| 7,475,796 | B2 | 1/2009 | Garton | |
| 7,513,280 | B2 | 4/2009 | Brashears et al. | |
| 7,802,958 | B2 | 9/2010 | Garcia et al. | |
| 7,837,427 | B2 | 11/2010 | Beckel | |
| 7,878,327 | B2 * | 2/2011 | Cassina | 206/386 |
| 7,897,223 | B2 * | 3/2011 | Schubbach et al. | 428/35.7 |
| 7,921,783 | B2 | 4/2011 | Forbes et al. | |
| 7,958,995 | B2 * | 6/2011 | Dedmon et al. | 206/386 |
| 7,967,161 | B2 | 6/2011 | Townsend | |
| 8,083,083 | B1 | 12/2011 | Mohns | |
| 8,201,520 | B2 | 6/2012 | Meritt | |
| 8,313,278 | B2 | 11/2012 | Simmons et al. | |
| D688,351 | S | 8/2013 | Oren | |
| 8,505,780 | B2 | 8/2013 | Oren | |
| 8,585,341 | B1 | 11/2013 | Oren | |
| 8,616,370 | B2 | 12/2013 | Allegretti | |
| 8,622,251 | B2 | 1/2014 | Oren | |
| 8,668,430 | B2 | 3/2014 | Oren | |
| 8,827,118 | B2 | 9/2014 | Oren | |
| 8,887,914 | B2 | 11/2014 | Allegretti | |
| 2001/0022308 | A1 | 9/2001 | Epp et al. | |
| 2001/0045338 | A1 | 11/2001 | Ransil et al. | |
| 2002/0139643 | A1 | 10/2002 | Peltier et al. | |
| 2003/0111470 | A1 | 6/2003 | Fouillet et al. | |
| 2004/0084874 | A1 | 5/2004 | McDougall et al. | |
| 2004/0206646 | A1 | 10/2004 | Goh | |
| 2004/0245284 | A1 | 12/2004 | Mehus et al. | |
| 2005/0158158 | A1 | 7/2005 | Porta | |
| 2005/0201851 | A1 | 9/2005 | Jonkka | |
| 2006/0180062 | A1 | 8/2006 | Furrer et al. | |
| 2006/0180232 | A1 | 8/2006 | Glewwe et al. | |
| 2006/0239806 | A1 | 10/2006 | Yelton | |
| 2006/0267377 | A1 | 11/2006 | Lusk et al. | |
| 2007/0125543 | A1 | 6/2007 | McNeel et al. | |
| 2008/0008562 | A1 | 1/2008 | Beckel et al. | |
| 2008/0029546 | A1 | 2/2008 | Shuld | |
| 2008/0029553 | A1 | 2/2008 | Culleton | |
| 2008/0179054 | A1 | 7/2008 | McGough et al. | |
| 2008/0179324 | A1 | 7/2008 | McGough et al. | |
| 2008/0213073 | A1 | 9/2008 | Benedict et al. | |
| 2008/0226434 | A1 | 9/2008 | Smith et al. | |
| 2008/0264641 | A1 | 10/2008 | Slabaugh et al. | |
| 2009/0038242 | A1 | 2/2009 | Cope | |
| 2009/0078410 | A1 | 3/2009 | Krenek et al. | |
| 2010/0021258 | A1 | 1/2010 | Kim | |
| 2010/0038143 | A1 | 2/2010 | Burnett et al. | |
| 2010/0040446 | A1 | 2/2010 | Renyer | |
| 2011/0011893 | A1 | 1/2011 | Cerny | |
| 2011/0017693 | A1 | 1/2011 | Thomas | |
| 2011/0101040 | A1 | 5/2011 | Weissbrod | |
| 2011/0222983 | A1 | 9/2011 | Dugic et al. | |
| 2012/0219391 | A1 | 8/2012 | Teichrob et al. | |
| 2013/0004272 | A1 | 1/2013 | Mintz | |
| 2013/0022441 | A1 | 1/2013 | Uhryn et al. | |
| 2013/0206415 | A1 | 8/2013 | Sheesley | |
| 2013/0209204 | A1 | 8/2013 | Sheesley | |
| 2013/0233545 | A1 | 9/2013 | Mahoney | |
| 2013/0309052 | A1 | 11/2013 | Luharuka | |
| 2014/0020892 | A1 | 1/2014 | Oren | |
| 2014/0023465 | A1 | 1/2014 | Oren et al. | |
| 2014/0083554 | A1 | 3/2014 | Harris | |
| 2014/0097182 | A1 | 4/2014 | Sheesley | |
| 2014/0166647 | A1 | 6/2014 | Sheesley | |
| 2014/0203046 | A1 | 7/2014 | Allegretti | |
| 2014/0234059 | A1 | 8/2014 | Thomeer | |
| 2014/0321950 | A1 | 10/2014 | Krenek et al. | |
| 2015/0069052 | A1 | 3/2015 | Allegretti et al. | |

FOREIGN PATENT DOCUMENTS

| | | |
|---|---|---|
| JP | 410087046 | 4/1998 |
| JP | 10264882 | 10/1998 |
| MX | 2012011046 | 5/2013 |
| WO | 9008082 | 7/1990 |
| WO | 2010026235 | 3/2010 |
| WO | 2012021447 | 2/2012 |
| WO | 2012058059 | 5/2012 |

OTHER PUBLICATIONS

International Search Report for related International Application No. PCT/US2013/035442, Jun. 23, 2013.

International Search Report for related International Application No. PCT/US2013/032819, May 23, 2013.

International Search Report for related International Application No. PCT/US2013/049028, Mar. 4, 2014.

International Preliminary Report on Patentability for PCT/US2012/066639, Feb. 26, 2013.

International Preliminary Report on Patentability for PCT/US2013/032819, Sep. 23, 2014.

International Search Report for PCT/US2015/012990, dated May 6, 2015. (15 pages).

FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).

File History for U.S. Appl. No. 61/538,616, Robert A. Harris, Sep. 23, 2011. (21 pages).

International Search Report for PCT/US2015/024810, Jul. 8, 2015. (13 pages).

European Search Report for Application No. 15167039.5, Sep. 8, 2015. (7 pages).

SandBox Logistics, "Mine to Wellhead Logistics," Houston, TX, May 2013.

SandBox Logistics, screenshots from video made in Apr. 2013 and publicly shown in May 2013, Amegard, North Dakota.

International Search Report for PCT/US15/35635, Oct. 30, 2015, (12 pages).

* cited by examiner

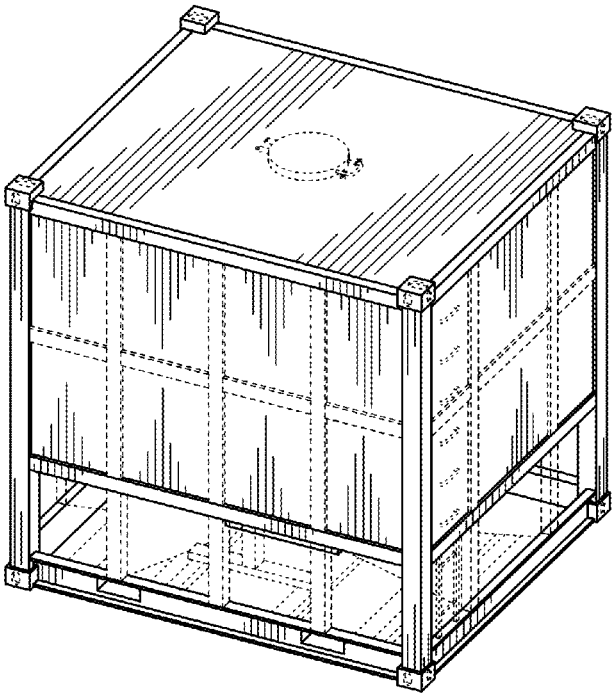
FIG. 1
Amended
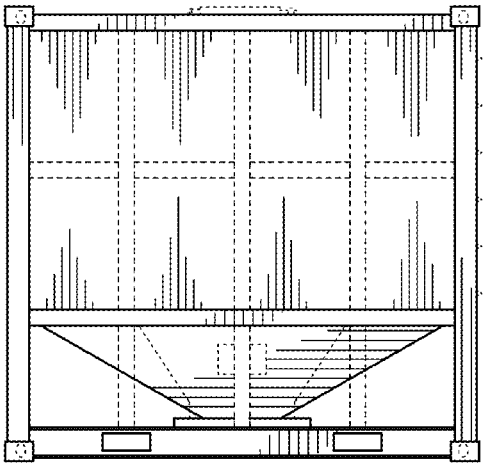
FIG. 2
Amended
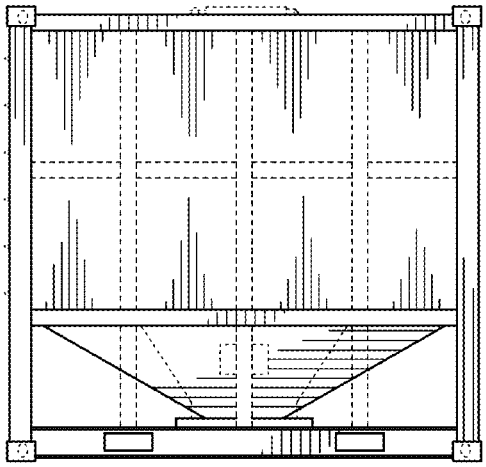
FIG. 3
Amended

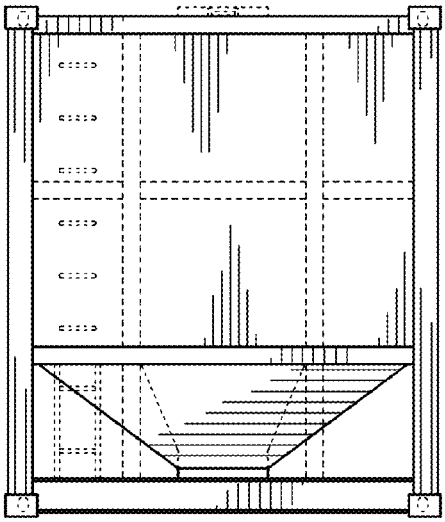
FIG. 4
Amended
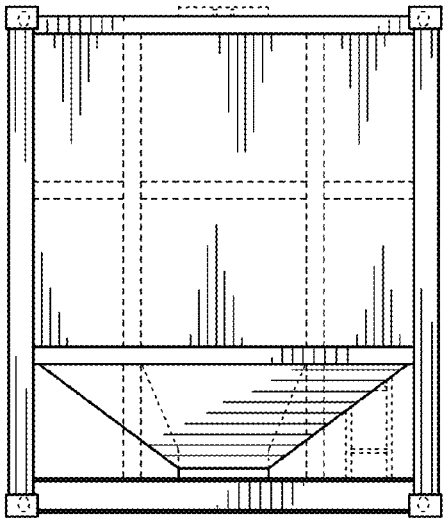
FIG. 5
Amended
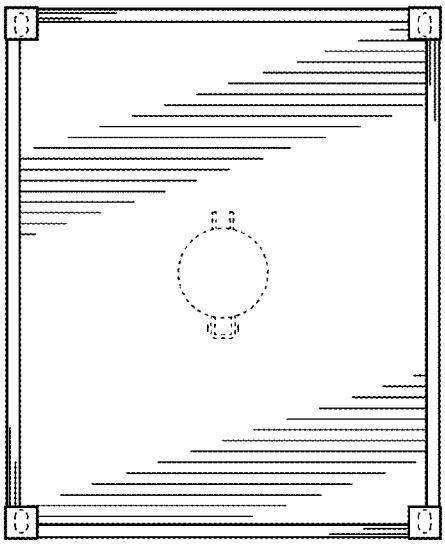
FIG. 6
Amended
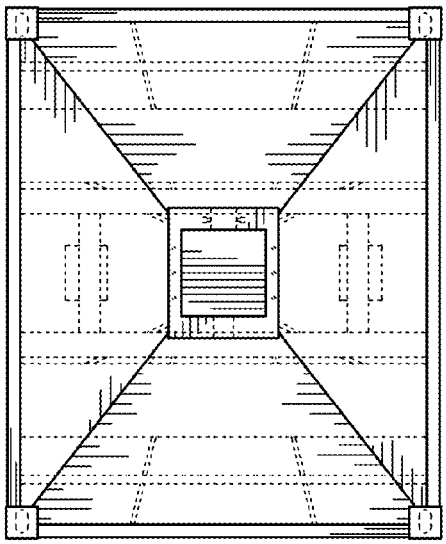
FIG. 7
Amended